Nov. 27, 1934.   J. P. GROSET ET AL   1,981,862
MACHINE FOR MAKING ICE CREAM CONES AND THE LIKE
Filed Jan. 10, 1931   4 Sheets-Sheet 1
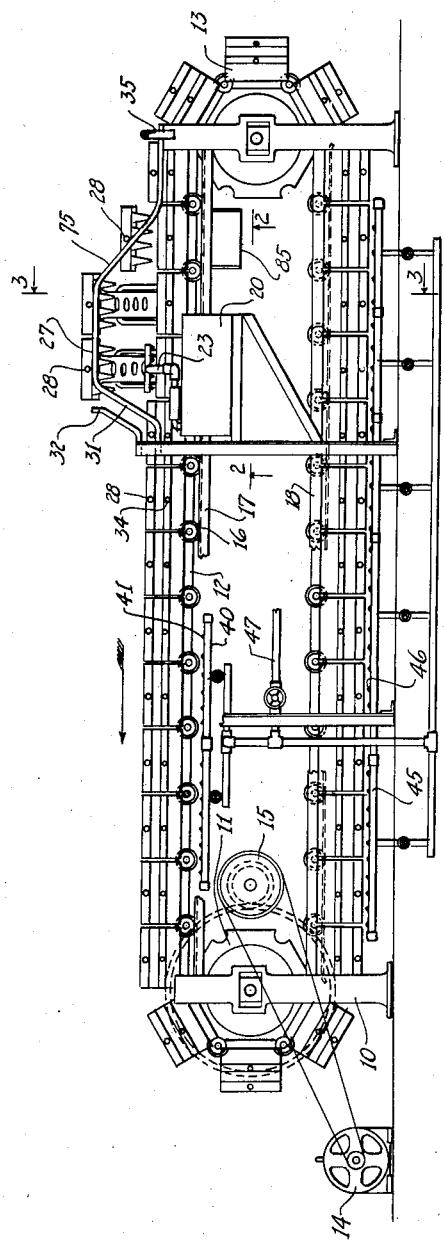
INVENTORS:
John P. Groset
Christ J. Halset
By E. J. Andrews
Atty.

Nov. 27, 1934.   J. P. GROSET ET AL   1,981,862
MACHINE FOR MAKING ICE CREAM CONES AND THE LIKE
Filed Jan. 10, 1931   4 Sheets-Sheet 2

INVENTORS:
John P. Groset
Christ J. Halset
By E. J. Andrews
Atty.

INVENTORS:
John P. Groset
Christ J. Halset
By E.J. Andrews
Atty.

Nov. 27, 1934.    J. P. GROSET ET AL    1,981,862
MACHINE FOR MAKING ICE CREAM CONES AND THE LIKE
Filed Jan. 10, 1931    4 Sheets-Sheet 4
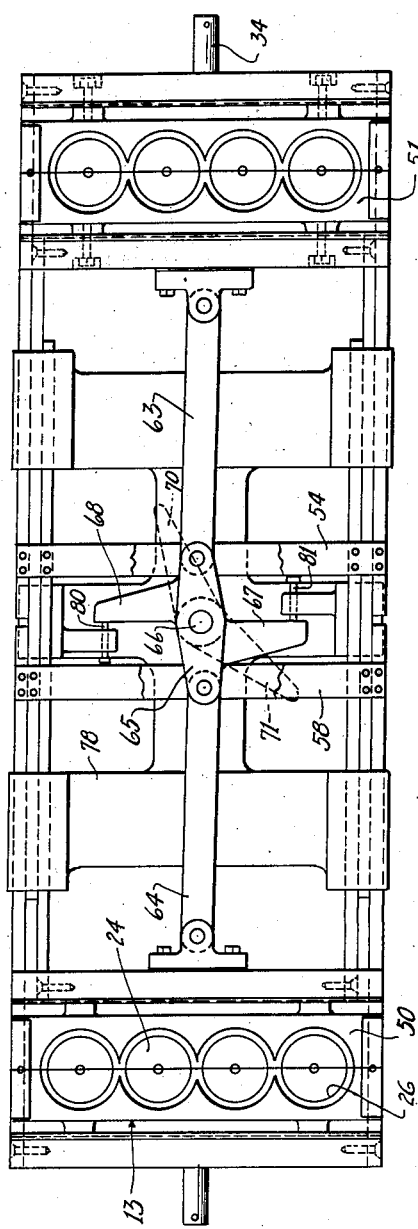
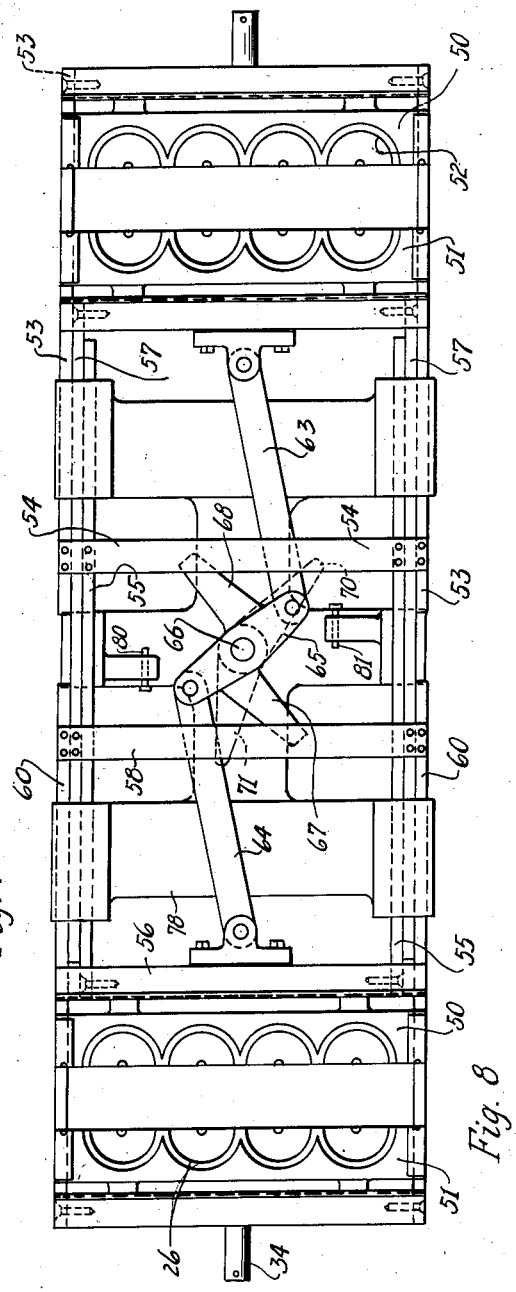
Fig. 7.
Fig. 8.
INVENTORS:
John P. Groset
Christ J. Halset
By E. J. Andrews
Atty.

Patented Nov. 27, 1934

1,981,862

UNITED STATES PATENT OFFICE 1,981,862

MACHINE FOR MAKING ICE CREAM CONES AND THE LIKE

John P. Groset and Christ J. Halset, Chicago, Ill., assignors to Ideal Machine Company, Chicago, Ill., a corporation of Illinois Application January 10, 1931, Serial No. 507,800

9 Claims. (Cl. 107—58)

Figure 3:
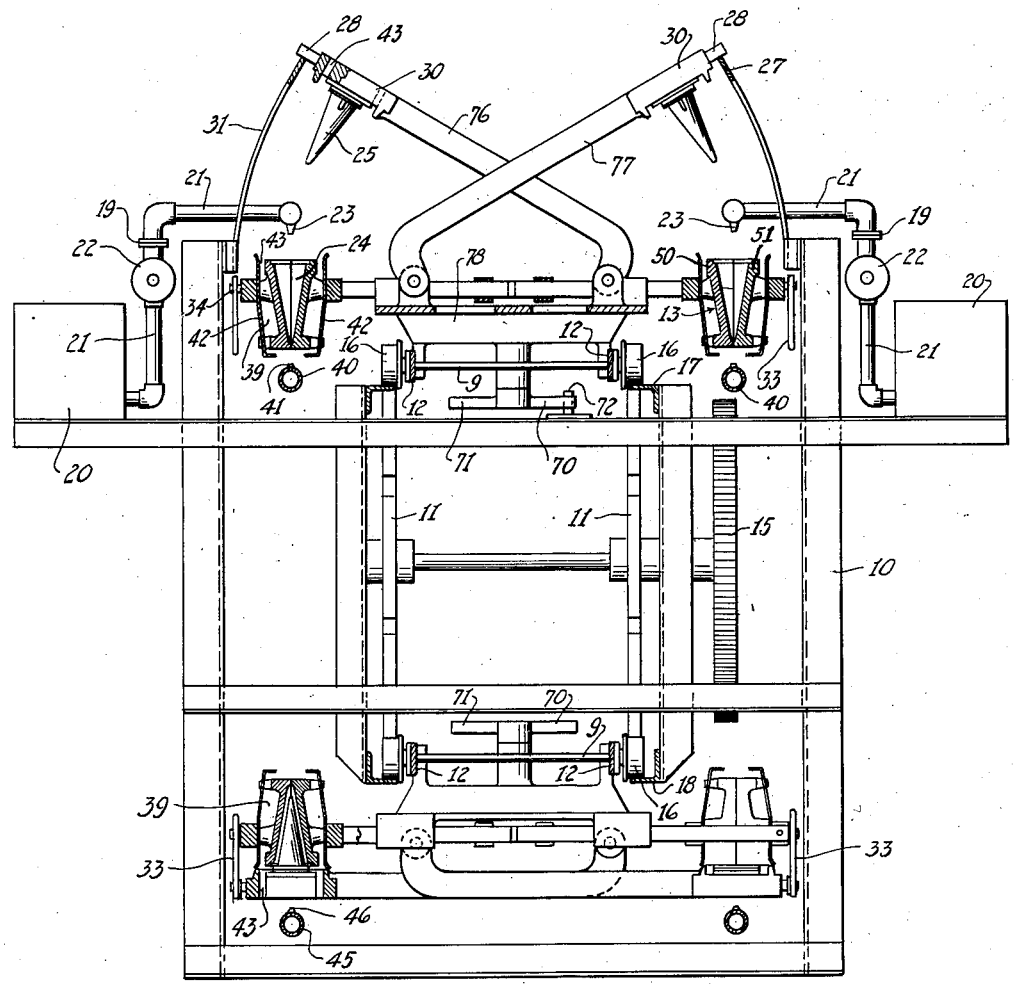
Figure 4:
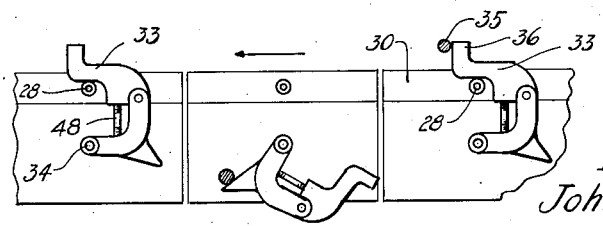
Figure 5:
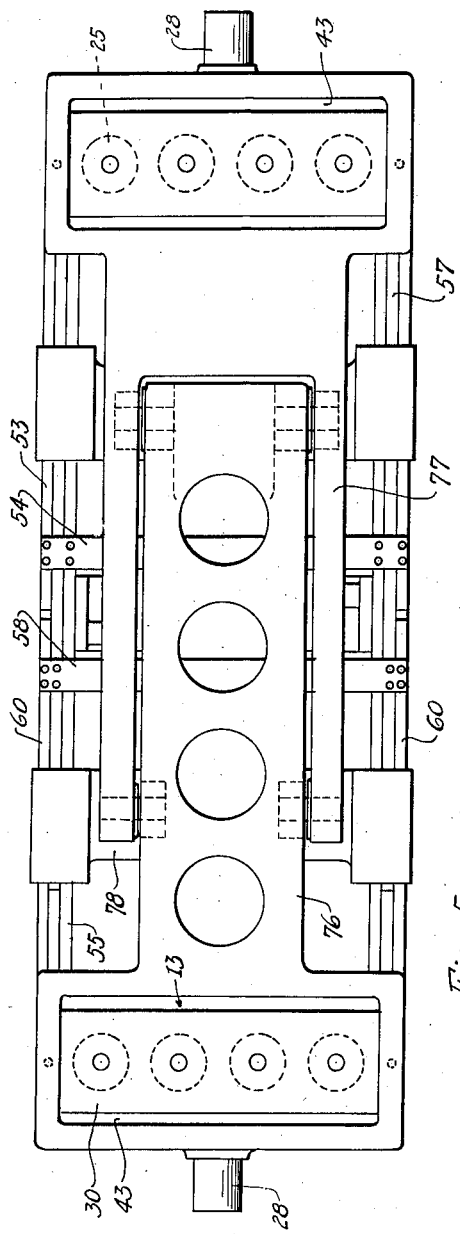
Figure 6:
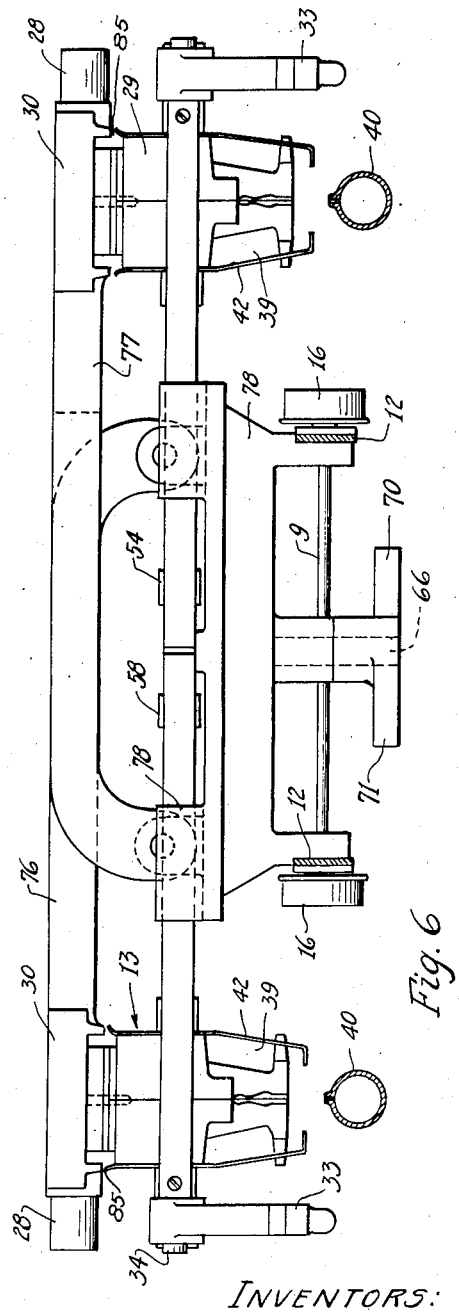

This invention relates to machines for making ice-cream cones, other pastry products, and the like. It has for one of its objects providing a machine of this nature that is operated by chain belts along horizontal paths. Another object is to provide a double system. That is, the machine has two systems of molds operating in parallel with each other, arranged so that either system or both may be used if desired; and each of the systems is composed of a series of independent units arranged so that any of the units may be removed without interfering with the operation of the other units. Another object is to provide for opening and closing the corresponding molds in the two systems simultaneously and in an improved manner. Another object of the invention is to provide improved means for heating the molds as the batter is being cooked. A further object is to arrange the heating means so as to prevent waste of heat and, at the same time, to prevent portions of the machine other than the molds from being heated abnormally, particularly the means which delivers the batter to the molds. Other objects of the invention will be apparent from a consideration of the accompanying drawings and the following description thereof:

Of the drawings, Fig. 1 is an elevation of a machine which embodies the features of our invention, but shows only general features without much detail; Fig. 2 is an enlarged view along the line 2—2 of Fig. 1; Fig. 3 is an enlarged sectional view along the line 3—3 of Fig. 1; Fig. 4 is an enlarged view of means for locking together and unlocking the molds and cores; Fig. 5 is an enlarged plan view of two of the units of the system; Fig. 6 is an elevation of the units shown in Fig. 5; Fig. 7 is a view of the units of Fig. 5 with the molds closed; and Fig. 8 is a similar view with the molds open.

The machine comprises a frame 10, Fig. 1, on each end of which are rotatably mounted two chain belt pulleys 11, by means of which are operated the chain belts 12. The belts are connected by shafts 9. The belts are operated by any suitable means, such as an electric motor 14 operating the wheel 15 which operates one of the pulleys 11. The upper sides of the belts as they are rotated are supported by means of rollers 16 on rails 17, and the lower sides of the belts are supported on the rollers 16 by rails 18. Mounted on each pair of adjacent shafts 9 is a frame 78.

The mold elements are arranged in units 13, Fig. 5. These units are supported by the frames 78. The units on the same side of the machines are independent of each other. But the two units on the opposite sides of the same frame 78 are connected with each other as hereinafter described. The method of operation of all of the mold units is normally similar, and the two opposite units normally operate simultaneously by co-acting means.

Each mold unit comprises a matrix consisting of two separable sections 50 and 51, Fig. 8, forming four recesses or cavities 24 for receiving the batter to be molded and baked. The unit also comprises four cores 25, Fig. 3, adapted to pass into the cavities. The molds are opened and closed by suitable mechanism during the normal operation of the machine at proper times, and the cores are raised and lowered properly by means hereinafter described.

The batter may be supplied to the molds in any suitable manner. We prefer for the purpose a tank 20 in which the batter may be placed. Connected to the lower portion of the tank is a pipe 21, and in this pipe is mounted a pump 22, the pump being of any suitable nature and operated in any suitable manner. As the pump is operated, the batter is forced through the pipe 21 and out of the nozzles 23. In normal operation, the batter is intermittently forced out of the nozzles 23 into the various cavities as they are passed along under the nozzles. Connected in the pipe 21 is a rotatable joint 19, by means of which the nozzles can be swung away from over the matrices, so as to avoid any baking of the batter in the pipe or nozzles when the nozzles are not in use.

In operation, as the matrices, as indicated in Fig. 3, move along beneath the nozzles 23, sufficient batter is inserted for the formation of the cone desired. As the matrices pass onwardly from the nozzles 23 in the direction of the arrow, Fig. 1, the cores are allowed to move downwardly and pass into the cavities. As the matrices are being filled, the cores are supported by rails 27 on which rest rollers 28 fixed to the core blocks 30. As the matrices and cores pass onwardly, the rollers 28 pass down the incline 31, and the cores are thus allowed to pass into the cavities. An arm 32 may be provided to assist in passing the cores downwardly, in case it should be necessary.

As soon as the cores are passed into the cavities, the frame of each matrix and its core are locked together by any suitable means. We prefer for this purpose a hook 33 pivoted to the frame of the matrices by means of a pin 34, the hook passing over the corresponding roller 28 of the core block. In this manner, the cores are held firmly in the cavities as the batter is baking. Adjusting screws 48 are provided for varying the effect of the hook 33 on the cores. The hooks are operated as hereinafter described.

The means which we provide for baking the batter comprises gas pipes 40 having gas jets 41 in their upper sides. The pipes are mounted immediately beneath the path of the mold units. Plates 42 are fixed to each unit in any suitable manner, and they extend from one end to the other on each side of each unit. These plates are spaced away from the matrices, as indicated in Fig. 3, and extend downwardly so as to receive the burning gases and pass them upwardly between the plates and the matrices. In this manner, owing to the continual uprising stream of gases, the hot gases are forced upwardly through the passageways 39 along the sides of the matrices and pass on outwardly above the core blocks through passageways 43 in the blocks. At the ends of the units the passageways are closed by plates 29. In this manner, the heat is directed where needed and it is prevented from heating other elements than the molds themselves. The gas jets are positioned at one side of the feeding mechanism, so that there is no liability of the batter in the pipe 21 being materially affected by the heat, and the core elevating mechanism is not affected. Gas pipes 45 with jets 46 are also provided beneath the molds on the lower side of the chain belts.

The gas is applied to the jets in any suitable manner, such as by means of a supply pipe 47. The jets beneath the lower molds in the pipes 45 pass the hot gases upwardly through the same passageways, as is the case with the upper jets, but in the opposite direction. The gases from the lower jets pass first through the passageways 43 of the blocks and then through the passageways 39 of the matrices. So that the heat is confined to the molds and cores, whether applied to the upper molds or to the lower molds. The gas jets 46 extend substantially entirely under the path of movement of the lower molds and are of sufficient length, taken together with the jets 41, to properly bake the batter. Openings 85 are provided between the upper edges of the casings 42 and the core blocks 30. These openings allow much of the steam generated by baking the batter in the molds to pass out without materially interfering with the burning gases. The steam passing out of the molds strikes the core blocks and is by these deflected horizontally outwardly and through the openings 85, while the burning gas passes along the sides of the blocks through the passageways 43. This occurs whether the molds are upright or inverted.

After the batter has been baked, the units are elevated by the chain belt, and the core blocks are unhooked from the matrices. This is accomplished by means of pins 35, fixed to the frame of the machine. As the matrices approach the filling position, an arm 36 fixed to the hook 33 strikes the pin 35, and the hook 33 is forced off from the roller 28, thus releasing the core block 30.

The core blocks are then elevated by the track 75. Each core block 30 is fixed to an arm 76 or 77, Fig. 5, the arms being pivoted at their inner ends to the frame 78, which supports the mold units and the slidable bars 53, 55, 57 and 60.

The matrix sections are then separated and the baked cones drop out. The mechanism for separating the sections of the matrices is arranged to separate the sections of both of the units of the associated pair simultaneously. Each of the units comprises two sections 50 and 51 in each of which is a half section 26 of the cavity 24. These sections 50 and 51 are slidably mounted in the frame 78, and the sections 50 and 51 of one unit are fixed to the respective sections 50 and 51 of the other unit of the pair. The right hand section 50, Fig. 8, is fixed to a bar 53 and this bar in turn is fixed to a cross bar 54. To this cross bar is fixed another slidably mounted bar 55, and the bar 55 is fixed to the section 50 of the other unit. So that, when the right-hand section 50 is moved, the left-hand section 50 will be moved correspondingly. Also, the left-hand section 51 is fixed to a slidably mounted bar 60. This bar in turn is fixed to a cross bar 58, and another slidable bar 57 is fixed to the cross bar 58 and to the section 51 of the other unit.

In each case, these connecting bars are duplicated on the two sides of the units, for the purposes of rigidity and to prevent binding. It will thus be seen that, as the sections 50 and 51 of one unit are separated or closed, the sections of the other unit will be similarly operated.

The inner sections of the two units are connected by means of toggle mechanism comprising a link 63 pivoted to the right-hand section 51 and a link 64 pivoted to the left-hand section 50. The inner ends of these links are pivotally connected, by means of a lever 65 which is fixed to a rod 66 rotatably mounted in the frame 78. When the lever 65 is rotated to the angle indicated by Fig. 7, with the links 63 and 64 substantially in line, the matrix sections are closed and are held by the links in the closed positions, as they are then in line. But, when the lever 65 is rotated to the position indicated in Fig. 8, the links 63 and 64 are drawn inwardly, carrying with them the inner sections 50 and 51, and the sections are thus forced apart.

The mechanism, which we have provided for operating the lever 65, and the matrix sections comprise the rod 66 which projects downwardly and at the lower end of which is fixed a pair of arms 70 and 71, Fig. 2. Fixed to the frame 10 of the machine is a pin 72, against which the arms 70 strike when the molds reach the opening position. The rod 66 is thus rotated, carrying with it the lever 65 and drawing the links 63 and 64 inwardly, so as to open the matrices. And, when the matrices reach the closing position, the arm 71 strikes against a pin 73 fixed to the frame 10, and the lever 65 is thus rotated back to the closed position.

In order to prevent the lever 65 from over-running, adjustable stops 80 and 81, Fig. 8, are provided, fixed to the frame 78, and arms 67 and 68 are fixed to the rod 66. These arms, by striking the respective stops, limit the rotation of the rod 66 at the proper open or closed position of the matrix sections.

When the matrices are open, the cores are elevated by the roller 28 passing up the incline 75 of the bar 27, and the cones drop from the cores into a box or slide 85, and they are removed in any suitable manner and are disposed of as may be desired. The cores are held above the molds by the bar 27 until the batter has been received, and the cores are then allowed to descend, as hereinabove described.

Although we have shown our machine with similar cone molds on the opposite sides, yet, it is to be understood that the molds may differ or some may be omitted altogether, without interfering with the operation of the others. And, although various other types of cups and molds might be formed, yet, in Fig. 14, we illustrate the preferred types, any or all of which could be made, and made simultaneously if desired, in our machine.

We claim:

1. An ice-cream cone machine comprising a frame, a plurality of mold supports movably mounted on said frame, means for moving said supports longitudinally of said frame, means for molding cones mounted on each of said supports on each side of the path of motion thereof, each of said means comprising a matrix having a plurality of cone molding cavities therein, a plurality of cores, and means for passing said cores into and out of the respective cavities, each of said latter means comprising an arm pivoted to the side of said support opposite to that of the associated cavity.

2. An ice-cream cone machine as claimed in claim 1, in which one of said arms has a yoke on its pivoted end, and the other arm has its pivoted end positioned between the arms of said yoke.

3. An ice-cream cone machine comprising a frame, a plurality of mold supports movably mounted on said frame, means for moving said supports longitudinally of said frame, means for molding cones mounted on each of said supports on each side of the path of motion thereof, each of said means comprising a matrix having a plurality of cone molding cavities therein, a plurality of cores, and means for passing said cores into and out of the respective cavities, each of said matrices comprising two movable sections, the inner section of the matrix on one side of the support being connected to the outer section of the matrix on the opposite side of the support.

4. In an ice-cream cone machine, a frame, a mold support movably mounted on said frame, means for moving said support longitudinally of said frame, ice-cream cone matrices mounted on said support on each side of the path of motion thereof, each of said matrices comprising two movable sections, and means for moving the sections of each matrix towards and away from each other, said means comprising a toggle joint pivotally connecting the two inner sections of the respective matrices, and means for shortening and lengthening said joint.

5. In an ice-cream cone machine, a frame, a mold support movably mounted on said frame, means for moving said support longitudinally of said frame, ice-cream cone matrices mounted on said support on each side of the path of motion thereof, each of said matrices comprising two movable sections, the inner section of each matrix being connected to the outer section of the other matrix, and means for moving the two inner sections towards and away from each other.

6. In an ice-cream cone machine as claimed in claim 5, said latter means comprising a link pivoted by one end to each of said inner sections, a link connecting the other ends of the said two links, and means for rotating said connecting link to move the pivoted ends of the said two links towards and away from each other.

7. In an ice-cream cone machine as claimed in claim 5, said latter means comprising a link pivoted by one end to each of said inner sections, a link connecting the other ends of the said two links, means for rotating said connecting link to move the pivoted ends of the other two links towards and away from each other, said means comprising arms fixed with reference to said connecting link and projecting from opposite sides thereof, and stops mounted on said frame for coacting with said arms to alternately rotate said connecting link in opposite directions.

8. In an ice-cream cone machine, a frame, a pair of spaced mold supports movably mounted on said frame, means for moving said supports longitudinally of said frame, a cone mold mounted on each support, each of said molds comprising a matrix having a movable section, means mounted between said sections for moving said sections away from and towards each other, said means comprising a link pivotally associated by one end with one section, a link pivotally associated by one end with the other section, a connecting link pivotally connecting the other ends of the said two links, and means for rotating said connecting link so as to move said other ends outwardly until said connecting link is in line with the other links.

9. In an ice-cream cone machine, a mold for forming the cones, means for inverting the mold, means for passing batter into the mold, means for heating the mold when in upright or inverted positions, said latter means comprising a gas jet positioned beneath said mold, a casing enclosing the sides of said mold and fixed with reference thereto, said casing being open at the bottom and top thereof, and passageways between said casing and mold connecting the said bottom and top openings, and a core block adapted to coact with the mold and projecting laterally beyond the inner surface of the mold, an opening being formed by the edge of said casing and the core block substantially opposite the adjacent surfaces of the end of the mold and the block, whereby steam as it passes out of the mold is deflected horizontally outwardly through said opening.

JOHN P. GROSET.
CHRIST J. HALSET.